United States Patent
Ho et al.

(10) Patent No.: US 7,326,071 B1
(45) Date of Patent: Feb. 5, 2008

(54) CARD CONNECTOR

(75) Inventors: Hsin-Tsung Ho, Taipei Hsien (TW);
Chung-Yu Chen, Taipei Hsien (TW);
Mei-Chuang Yang, Taipei Hsien (TW);
Chung-Hsin Huang, Taipei Hsien (TW)

(73) Assignee: Cheng Vei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/689,953

(22) Filed: Mar. 22, 2007

(51) Int. Cl.
*H01R 13/62* (2006.01)

(52) U.S. Cl. ...................... 439/159; 439/630

(58) Field of Classification Search ........... 439/159, 439/188, 607, 630
See application file for complete search history.

(56) References Cited

U.S. PATENT DOCUMENTS

| | | | |
|---|---|---|---|
| 6,648,694 B2 * | 11/2003 | Takamori et al. | 439/630 |
| 6,719,577 B2 * | 4/2004 | Nogami | 439/188 |
| 6,761,572 B1 * | 7/2004 | Chou | 439/188 |
| 6,981,885 B2 * | 1/2006 | Oh | 439/159 |
| 7,037,125 B1 * | 5/2006 | Kuan et al. | 439/159 |

* cited by examiner

*Primary Examiner*—Thanh-Tam Le
(74) *Attorney, Agent, or Firm*—WPAT, PC; Anthony King

(57) ABSTRACT

A card connector includes an insulating housing and an upper cover coupling with the insulating housing. The insulating housing includes a bottom wall, two sidewalls and a back wall, all the walls forming a receiving space therebetween to receive one of a variety of memory cards. One side of the receiving space defines a sliding groove and the other side defines a terminal cavity. Contacts which are divided into two groups are received in the insulating housing respectively. An ejecting apparatus is arranged in the sliding groove. An elastic terminal, located in the terminal cavity, has a base portion. An elastic arm connects with the base portion and continuously protrudes toward the inside bottom wall to form a contacting portion.

7 Claims, 5 Drawing Sheets

CARD CONNECTOR

BACKGROUND OF THE INVENTION

1. Field of the Invention

The present invention relates to a card connector, and more particularly to a card connector capable of receiving different types of memory cards.

2. The Related Art

Memory cards are external memory media utilized in electronic devices such as a mobile phone. The data transmission between the memory cards and the electronic devices are accomplished through different card connectors. There are different kinds of memory cards in the market such as MSII(memory stick II), SD, SMC, MMC card, etc.

Traditionally, a single card connector was used to receive a single type of memory card. If a different type of memory card was to be used in a particular electronic device, a completely different card connector had to be employed. Consequently, as the development of technology, a multi-card connector has been designed for receiving multiple memory cards of different types.

A multi-card connector includes an insulating housing and a cover coupling with the insulating housing. The insulating housing defines at least one inserting groove. Contacts are received in the inserting groove respectively. In other space of the insulating housing, it defines another inserting groove that also receives a plurality of contacts. These inserting grooves with contacts are independent to mate with identifying memory cards. The multi-card connector is used for receiving two different types of memory cards in a stacked array.

However, the structure of the multi-card connector is very complex because of the plurality of inserting grooves defined in the insulating housing. Then it increases the manufacture cost of the multi-card connector. Further more, since the science and technology development rapid, the design of related electronic devices tends to become compact. Therefore, the multi-card connector described above cannot suit to the compact electronic devices.

SUMMARY OF THE INVENTION

Accordingly, an object of the present invention is to provide a compact card connector which can receive different types of memory cards. The card connector includes an insulating housing and an upper cover coupling with the insulating housing. The insulating housing has a bottom wall, two sidewalls and a back wall. The bottom wall, the two sidewalls and the back wall form a receiving space therebetween to receive one of a variety of memory cards. One side of the receiving space defines a sliding groove and the other side of the receiving space defines a terminal cavity. The contacts which are divided into two groups are received in the insulating housing respectively. An ejecting apparatus is arranged in the sliding groove. An elastic terminal, located in the terminal cavity, has a base portion. An elastic arm connects with the base portion and continuously protrudes toward the inside receiving space and then extends backward to form a contacting portion.

As described above, while a memory card is inserted in the card connector, the contacting portion of the elastic terminal presses one side of the memory card to make the other side of the memory card stay close to the ejecting apparatus. Then the memory card can be inserted or extracted from the card connector steadily. So different scale memory cards can be inserted in the same card connector because of the elastic terminal. At the same time, the structure of the card connector with the elastic terminal is much simpler. Therefore, the manufacture cost of the card connector is reduced.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
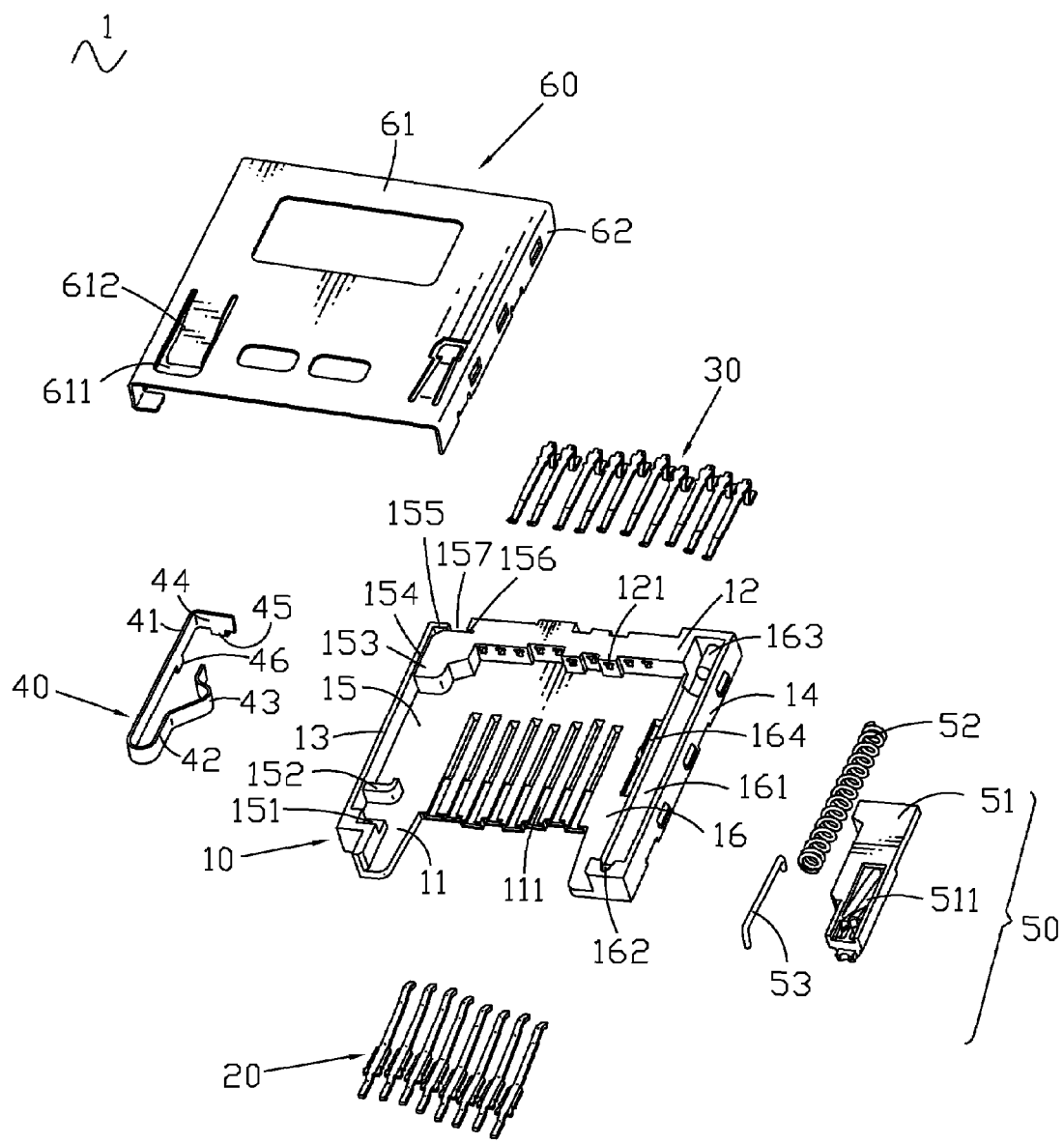
FIG. 1 is an exploded view of a card connector of the present invention.

Referring to FIG. 1, an embodiment of a card connector 1 according to the present invention includes an insulating housing 10, the first contact group 20, the second contact group 30, the two contact groups received in the insulating housing 10, an elastic terminal 40 which is received in one side of the insulating housing 10, an ejecting apparatus 50 arranged in the other side of the insulating housing 10, and an upper cover 60 coupling with the insulating housing 10.

Figure 4:
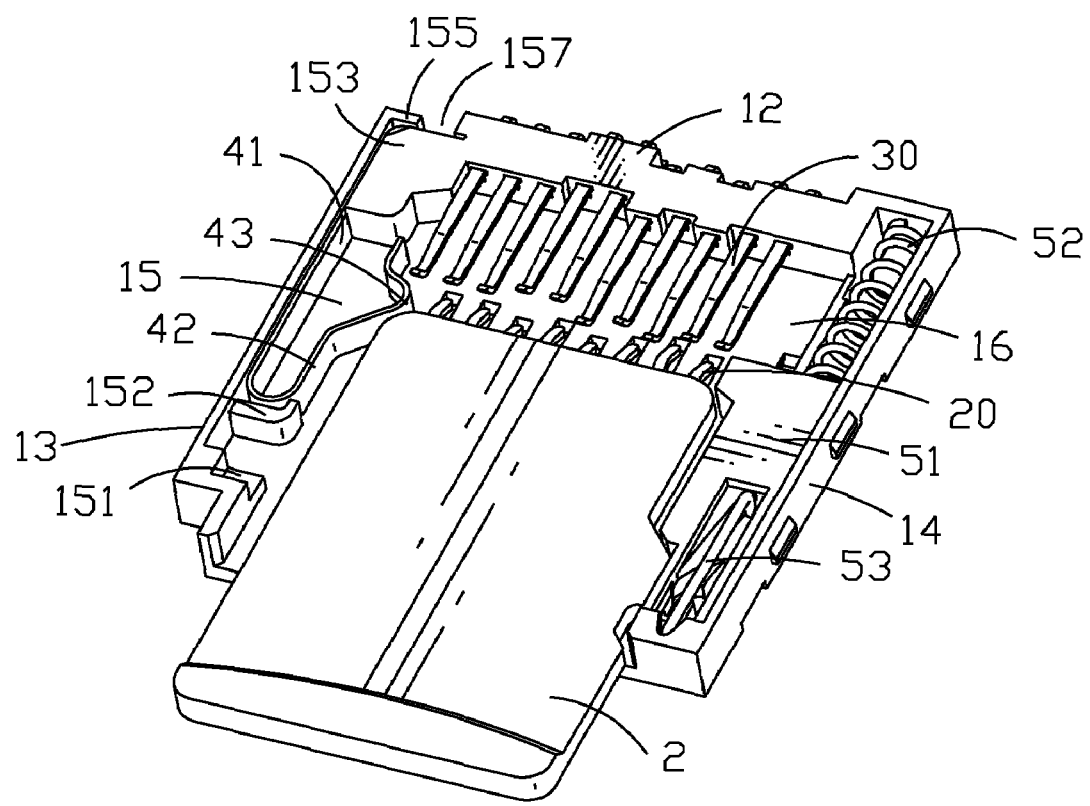
FIG. 4 is a perspective view of the card connector without the upper cover, in which a Micro SD card is inserted.

As shown in FIG. 1, the insulating housing 10 includes a bottom wall 11, a back wall 12, a first sidewall 13 and a second sidewall 14, all the walls defining a receiving space therebetween to receive one of a variety of memory cards (shown in FIG. 4). The back wall 12 extends upward from the rear edge of the bottom wall 11 and defines a plurality of receiving holes 121. The receiving holes 121 are opened through the back wall 12. The first sidewall 13 and the second sidewall 14 extend upward from two opposite sides of the bottom wall 11. A plurality of contact slots 111 passing through the front of the insulating housing 10 are defined in the front central portion of the bottom wall 11. Between one side edge of the contact slots 111 and the first sidewall 13 there forms a terminal cavity 15 that receives the elastic terminal 40. In the front portion of the inner side of the terminal cavity 15 there opens a ladder-shaped recess 151. A preventing wall 152 is formed behind the recess 151. One end of the preventing wall 152 connects with the first sidewall 13 and the other end of the preventing wall 152 bends to back. The terminal cavity 15 protrudes upward to form a cooperating portion 153 at the rear portion. A receiving groove 154 is formed between the exterior side of the cooperating portion 153 and the first sidewall 13. The receiving groove 154 defines a locating hole (not shown) at its bottom. The rear end of the first sidewall 13 bends vertically to form a stopping wall 155. A locating recess 156 is formed between the back surface of the cooperating portion 153 and the stopping wall 155. The stopping wall 155 defines a locating opening 157 passing through the stopping wall 155 thereof. Between the other side edge of the contact slots 111 and the second sidewall 14 an accommodating cavity 16 receiving the ejecting apparatus 50 is defined. A part portion that connects with the second sidewall 14 protrudes upward a little and then hollows inside to form a sliding groove 161. The front portion of the sliding groove 161 defines an inserting hole 162 and the back surface of the sliding groove 161 protrudes forward to form a guiding pillar 163. Next to the sliding groove 161, a locating slot 164 is defined in the accommodating cavity 16.

The elastic terminal 40 received in the terminal cavity 15 of the insulating housing 10 has a board-shaped base portion 41 arranged lengthwise. The front end of the base portion 41 extends forward and then bends backward to form an elastic arm 42. The rear end of the elastic arm 42 continuously protrudes inside the bottom wall 11 and then extends backward, forming a contacting portion 43. The rear end of the contacting portion 43 stretches backward. The rear end of the base portion 41 bends vertically to form a locating-section 44. The bottom surface of the locating-section 44 extends downward and then bends to back, forming a flat block 45. The bottom of the base portion 41 extends downward to form a bulge 46.

The ejecting apparatus 50 includes a slide element 51, a spring 52 and a locating shaft 53. The slide element 51 defines a groove 511 in the front portion for the locating shaft 53 sliding along.

The upper cover 60 with the front portion and back portion opened couples with the insulating housing 10. The upper cover 60 has a top plank 61 and two side planks 62 which are bent downward from both side edges of the top plank 61 respectively. One side of the top plank 61 defines an opening 611, and a buckling pill 612 is provided at the back end thereof and extended into the opening 611.

Figure 2:
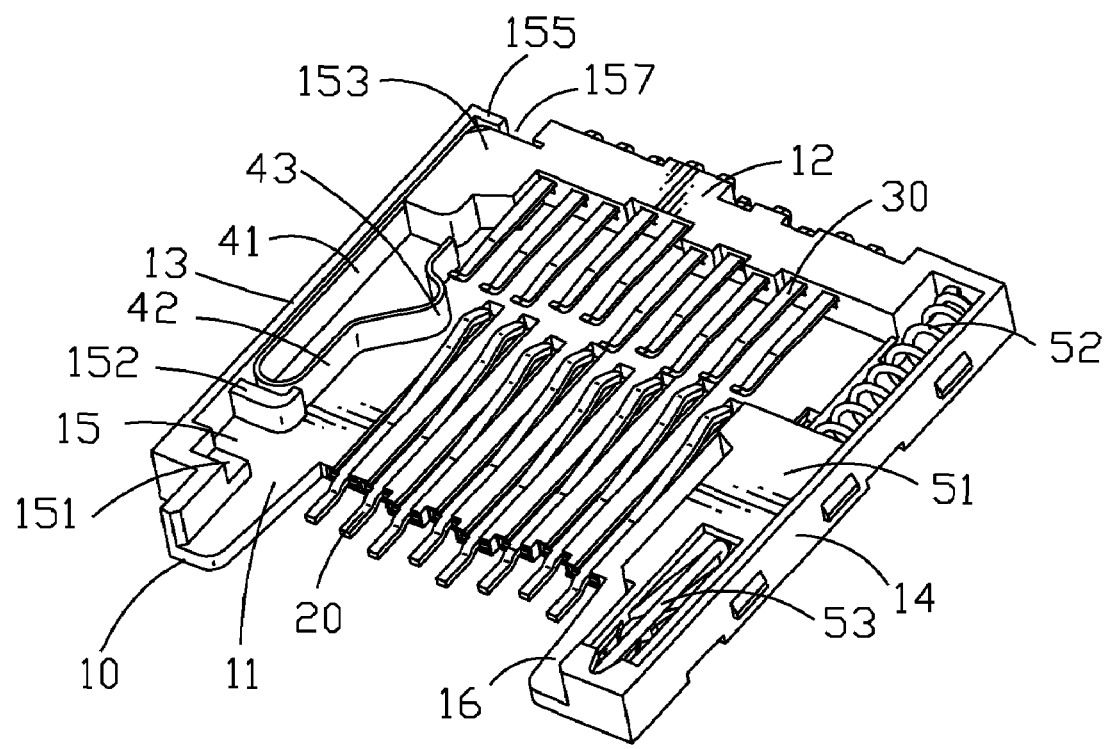
FIG. 2 is a perspective view of the card connector without an upper cover.
Figure 3:
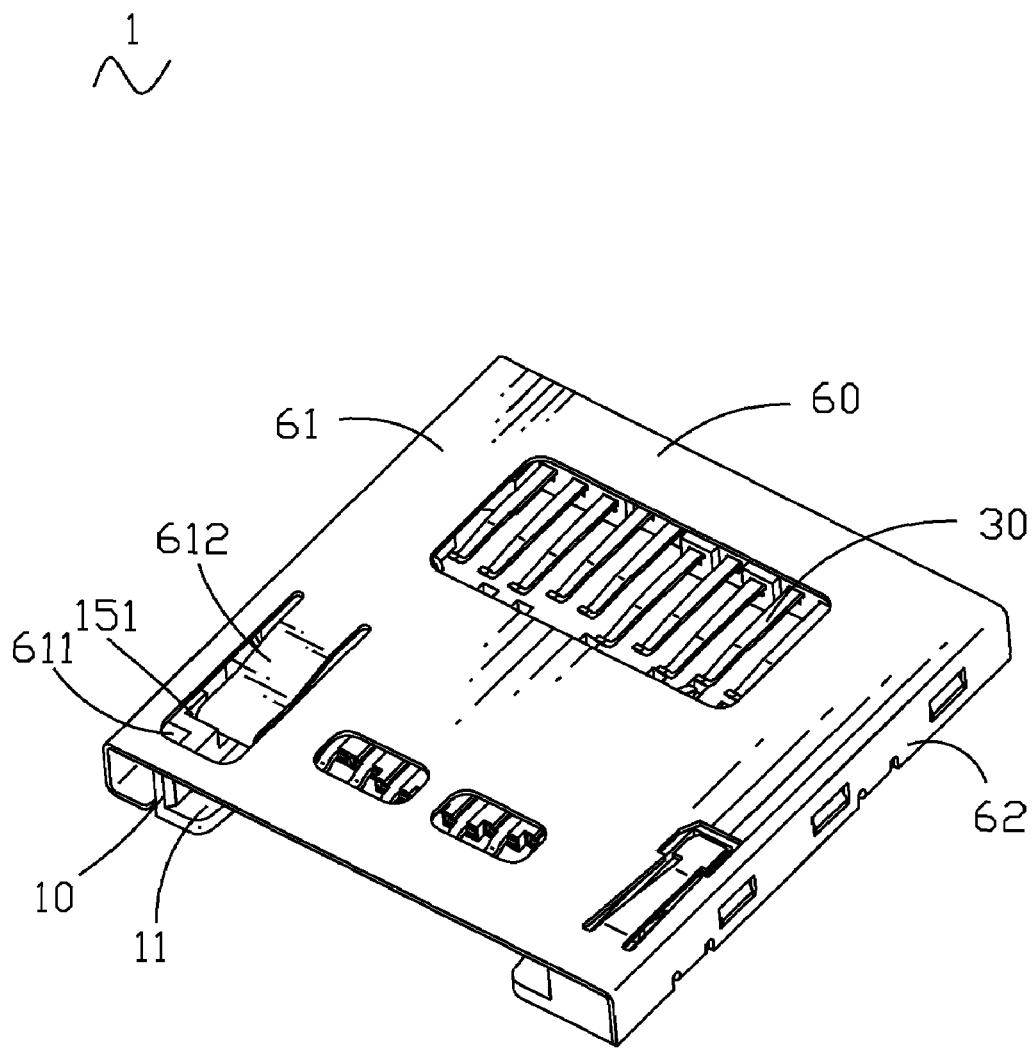
FIG. 3 is a perspective view of the card connector of the present invention.

With reference to FIGS. 1-3, in assembly, the first contact group 20 is received in the contact slots 111 of the bottom wall 11, and the second contact group 30 is inserted in the receiving holes 121 of the back wall 12 respectively and faces to the receiving space. The elastic terminal 40 is received in the terminal cavity 15 of the insulating housing 10 with the rear part of the base portion 41 and the locating-section 44 receiving in the receiving groove 154 and the locating recess 156 correspondingly. The bulge 46 is inserted in the locating hole. The flat block 45 stretches out of the locating opening 157. The front end of the base portion 41 clashes with the preventing wall 152 and the contacting portion 43 protrudes inside the bottom wall 11. The ejecting apparatus 50 is installed in the accommodating cavity 16 with the slide element 51 received in the sliding groove 161 and the locating slot 164. The spring 52 is received in the sliding groove 161 with one end hitched in the guiding pillar 163 and the other end connecting with the rear of the slide element 51. One end of the locating shaft 53 is inserted in the inserting hole 162 and the other end is placed in the groove 511. The upper cover 60 covers on the insulating housing 10 with the buckling pill 612 inserting in the recess 151 of the terminal cavity 15. The two side planks 62 of the upper cover 60 buckle with the first sidewall 13 and the second sidewall 14 respectively.

Referring to FIGS. 3-4, when a Micro SD card 2 is inserted into the insulating housing 10, the contacting portion 43 of the elastic terminal 40 presses one side of the Micro SD card 2 to make the other side of the Micro SD card 2 stay close to the ejecting apparatus 50. The movement of the Micro SD card 2 drives the slide element 51 of the ejecting apparatus 50 slide along the sliding groove 161. Then the spring 52 is compressed and the end of the locating shaft 53 slides along the groove 511 as the slide element 51 slides along the sliding groove 161. The electric module of the Micro SD card 2 contacts with the first contact group 20 at the time the end of the locating shaft 53 is blocked by the front portion of the groove 511. Then the Micro SD card 2 is located between the elastic terminal 40 and the ejecting apparatus 50 steadily.

Figure 5:
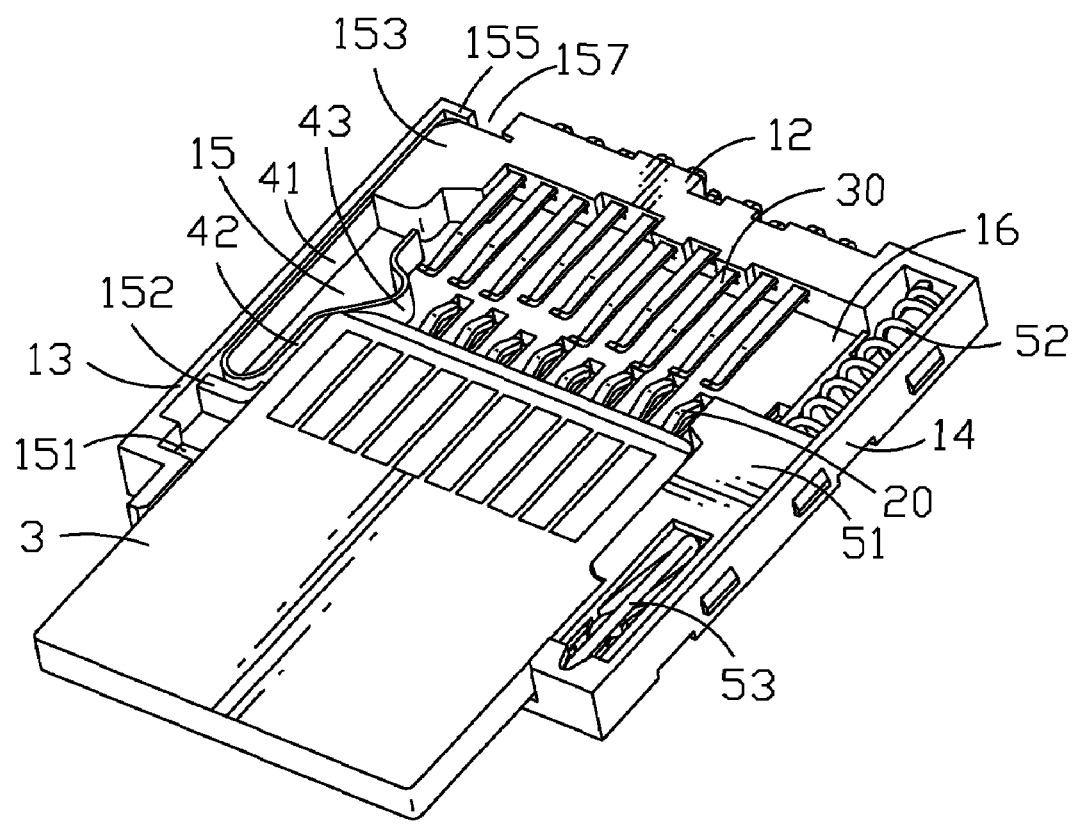
FIG. 5 is a perspective view of the card connector without the upper cover, in which a MMC Micro card is inserted.

Referring to FIG. 3 and FIG. 5, when a MMC Micro card 3 is inserted into the insulating housing 10, the contacting portion 43 of the elastic terminal 40 presses one side of the MMC Micro card 3 to make the other side of the MMC Micro card 3 stay close to the ejecting apparatus 50. The movement of the MMC Micro card 3 drives the slide element 51 of the ejecting apparatus 50 slide along the sliding groove 161. Then the spring 52 is compressed and the end of the locating shaft 53 slides along the groove 511 as the slide element 51 slides along the sliding groove 161. The electric module of the MMC Micro card 3 just contacts with the second contact group 30 at the time the end of the locating shaft 53 is blocked by the front portion of the groove 511. Then the MMC Micro card 3 is located between the elastic terminal 40 and the ejecting apparatus 50 steadily.

As described above, while a memory card is inserted in the card connector 1, the contacting portion 43 of the elastic terminal 40 presses one side of the memory card to make the other side of the memory card stay close to the ejecting apparatus 50. Then the memory card can be inserted or extracted from the card connector 1 steadily. So different scale memory cards can be inserted in the same card connector 1 because of the elastic terminal 43. At the same time, the structure of the card connector 1 with the elastic terminal 43 is compact. Therefore, the manufacture cost of the card connector 1 is reduced.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card connector, comprising:
    an insulating housing, including a bottom wall, two sidewalls and a back wall, a receiving space being formed therebetween, one side of the receiving space defining a sliding groove, the other side of the receiving space defining a terminal cavity;
    a plurality of contacts, received in the insulating housing respectively;
    an upper cover, coupling with the insulating housing;
    an ejecting apparatus, arranged in the sliding groove of the insulating housing;
    an elastic terminal, located in the terminal cavity of the insulating housing, having a base portion, an elastic arm connecting with the base portion, the elastic arm continuously protruding inside the receiving space and then extending backward to form a contacting portion; and
    wherein a rear portion of the terminal cavity protrudes upward to form a cooperating portion, a receiving groove is defined between an exterior side surface of the cooperating portion and at least one of the sidewalls of the insulating housing, a rear of the at least one of the sidewalls bends vertically to form a stopping wall, a rear part of the base portion is placed in the receiving groove and a rear end of the elastic terminal is prevented by the stopping wall.

2. The card connector as claimed in claim 1, wherein the base portion of the elastic terminal is board-shaped and contacts with the at least one of the sidewalls, a front end of the base portion extends and then bends backwards to form the elastic arm.

3. The card connector as claimed in claim 1, wherein a front portion of the terminal cavity protrudes upward and forms a preventing wall for blocking a front portion of the elastic arm.

4. The card connector as claimed in claim 1, wherein a locating recess is formed between a back surface of the cooperating portion and the stopping wall, a rear end of the base portion of the elastic terminal bends vertically and forms a locating-section, the locating-section is received in the locating recess.

5. The card connector as claimed in claim 4, wherein a bottom of the locating-section extends downward and then bends to back, forming a flat block, the stopping wall defines a locating opening passing through the stopping wall thereof, the flat block stretches out of the locating opening.

6. The card connector as claimed in claim 1, wherein a bottom of the base portion extends downward to form a bulge.

7. The card connector as claimed in claim 1, wherein the plurality of contacts is divided into two different contact groups for mating with two different types of memory cards respectively, one contact group is received in the bottom wall of the insulating housing, and the other contact group is inserted in the back wall of the insulating housing and faces to the receiving space.

\* \* \* \* \*